United States Patent
Cosgrove (10) Patent No.: US 7,637,258 B2
(45) Date of Patent: Dec. 29, 2009

(54) CHARCOAL/AIR BBQ COMBUSTION CHAMBER ASSEMBLY

(76) Inventor: Barry Cosgrove, 1545 Petrie Way, Mississauga, Ontario (CA) L5J IG6

( * ) Notice: Subject to any disclaimer, the term of this patent is extended or adjusted under 35 U.S.C. 154(b) by 0 days.

(21) Appl. No.: 11/846,648

(22) Filed: Aug. 29, 2007

(65) Prior Publication Data
US 2009/0056695 A1 Mar. 5, 2009

(51) Int. Cl.
A47J 37/00 (2006.01)
(52) U.S. Cl. .................. 126/25 R; 126/42; 126/60; 126/70; 126/71; 431/121; 431/326; 431/7
(58) Field of Classification Search ............. 126/25 R, 126/15 A, 26, 41 R, 29, 38, 41 D, 41 E, 51, 126/121, 299 D, 163 R, 77, 66, 763, 164, 126/144; 99/357, 450, 339, 352, 422, 447, 99/389; 98/36; 431/79, 326; 110/309
See application file for complete search history.

(56) References Cited

U.S. PATENT DOCUMENTS

| | | | |
|---|---|---|---|
| 3,159,119 A | 12/1964 | Hottenroth | |
| 3,266,478 A | 8/1966 | Booth | |
| 3,324,788 A | 6/1967 | La France | |
| 3,326,201 A | 6/1967 | Murray | |
| 3,327,697 A | 6/1967 | Berlant | |
| 4,287,870 A | 9/1981 | Johnson | |
| 4,788,905 A | 12/1988 | Von Kohorn | |
| 4,850,333 A | 7/1989 | Dellrud | |
| 4,867,050 A * | 9/1989 | Patenaude et al. | 99/400 |
| 5,154,159 A * | 10/1992 | Knafelc et al. | 126/25 R |
| 5,168,860 A | 12/1992 | Kibourian | |
| 5,176,124 A * | 1/1993 | Wrasse | 126/25 R |
| 6,943,321 B2 * | 9/2005 | Carbone et al. | 219/400 |

* cited by examiner

Primary Examiner—Steven B McAllister
Assistant Examiner—Avinash Savani (57) ABSTRACT

An open "funnel shaped" Inner Burner inside an open top Outer Casing. The casings closed base has a central hole accommodating the burners small open bottom Ash Exit. The space between the Inner Burner wall and Outer Casing wall forms an Annular Air Plenum that's supplied by an electric variable speed blower. Air enters the Burner Combustion space through perforations in the Burner/Plenum wall. This ensures rapid ignition and controls combustion rate (Temp). This also precipitates ash from burner Ash Exit, through the Ash Chute and into Storage Container fitted to outer casings base. A Radial diffuser centered on the heating surface provides a variable speed Lateral Air Sheet between heating and grill surfaces, instantly blowing "Smoke and Flare-Ups" to the outer burner perimeter. Unit is designed as a "Drop-In" unit to fit a manufacturer BBQ cart suitably equipped to specify basic installation requirements.

9 Claims, 5 Drawing Sheets

FIGURE 2A
COMBUSTION CHAMBER ASSEMBLY
X SECTIONAL VIEW

FIGURE 2B
COMBUSTION CHAMBER ASSEMBLY
SIMPLIFIED EMBODIMENT
X SECTIONAL VIEW

FIGURE 3
COMBUSTION CHAMBER ASSEMBLY
PLAN VIEW A-A
COMBUSTION SPACE

FIGURE 4
COMBUSTION CHAMBER ASSEMBLY
PLN VIEW B-B
ASH CHUTE

FIGURE 5
COMBUSTION CHAMBER ASSEMBLY
PLAN VIEW C-C
ASH CONTAINER

CHARCOAL/AIR BBQ COMBUSTION CHAMBER ASSEMBLY

TECHNICAL FIELD OF INVENTION

This invention relates to Barbeques in general, but more specifically to outdoor barbeques which use Charcoal and similar solid fuels. Currently 70-80% of barbeques sold are powered by gas and are of infinite variety in a crowded marketplace, the primary difference between most gas powered products being one of, Bigger/Smaller, with a choice of, More/Less, stainless steel. Any actual innovation or differentiation eluding manufacturers. Some claim to deliver "Real Charcoal BBQ Taste".

Charcoal fuelled units, which have not materially changed for several decades, are generally considered Messy, inconvenient, very slow and potentially hazardous. These make up a rapidly diminishing market share in a fast growing market. They are usually seen at campsites being essentially perceived as a portable unit or, in county parks as a permanent public convenience. It would appear that the last thing needed is another BBQ of any description, particularly one fuelled by charcoal. The fact is, there are virtually no viable alternatives to gas powered units which are perceived as convenient, clean and fast, despite the consumers overwhelming preference for the taste of food cooked over an open fire using charcoal as a fuel. This taste issue coupled with the fact that gas units may have been overrated in some respects leaves an unsatisfied void in the market.

DESCRIPTION OF RELATED ART

A search of relevant patent records will attest that during the past 2-3 decades there has been numerous patents outlining a wide variety of peripheral equipment and accessories related to the Traditional "Tray style" charcoal BBQ. Some of these may be useful and fulfill a purpose, but there have been few if any attempts during this period to progressively modernize or improve the mechanics of the basic "Tray Design" BBQ. Such a BBQ typically consisting of a rectangular metal tray with sides, containing a raised fuel/coal fire grate in the base of the tray with an adjustable Cooking grill mounted above. The complete unit is usually mounted on a post or legs. The latest "Development" is so called "Kettle" styled units. Instead of being square, circular or rectangular, these are generally comprised of a hemispherical lower bowl housing a bottom fuel fire grate with an adjustable cooking grill above. A hole in the base assists in ash removal. These units may be closed by a pivoting hemispherical lid. The primary improvements are essentially cosmetic with minor operating modifications, which can include a propane gas igniter wand.

Considering that 90% of gas BBQs sold are of a rectangular stainless steel appliance type design with side work surfaces and hinged top covers etc, there has been virtually no attempts to combine this exceptionally popular cart design with an Updated Charcoal fuelled cooking system.

There have been a few cart units that have a rectangular charcoal tray style burner mounted inside the outer casing, which can be winched Up and Down below the cooking grill to vary the temperature. However with the exception of some heat control, and in some cases a method of clearing out ashes, these units basically have the problems of the old style units. Even with highly competitive pricing these products do not seem to be what the consumer requires.

In records searched, lack of significant innovation in this field is conspicuous by its absence. There appears to have been no serious efforts to solve the long-standing real problems that could have helped to ensure the viability of charcoal as a fuel. Meaningful efforts have been virtually restricted to reducing the time required to fully ignite a bed of charcoal with a small fan.

Because the basic charcoal problems/inconveniences have remained the same for 25+ years, It is not surprising that there have not been any serious attempts to offer consumers the appliance style outdoor BBQ Cart preferred by them, even if powered by a charcoal fuel delivering the taste that apparently over 75% of consumers overwhelmingly prefer, in a unit that would enable "Open Fire" cooking, with its warm ambience.

The Inherent problems of charcoal fuelled barbeques remain and are:
1. Very slow from Cold start-Cook. Typically 30 minutes+, more using self lite briquettes.
2. No temperature control. Too hot, spray water bottle. Too cold, add fuel and wait.
3. Frequent "Fat Fires", "Flare Ups", and excess smoke. Spray with water bottle.
4. Messy ash Clean Up. Hot embers and blowing ash; wait to cool and dispose of.

Fortunately the problem with Charcoal fuelled BBQs was never the fuel, but with the obsolete combustion methods, inconvenient messy equipment and increasing valid consumer expectations driven by comparisons with "Convenient, fast, clean, gas fuelled" models in a steel/stainless steel trim appliance style cart. Accordingly there is clearly a need for an Integrated Combustion Chamber Assembly that comprehensively solves, simply, practically and cost effectively at least some of the above major problems comprehensively.

To solve the problems described and stated above. It has been necessary to depart from and re evaluate the traditional charcoal BBQ design concept. This combined with an awareness of modern low cost manufacturing techniques and capacity has resulted in the development of a completely new type and style of charcoal BBQ combustion chamber assembly having technical features and systems specifically designed to solve the above problems and to efficiently utilize charcoal or other suitable solid fuels in such a manner to deliver performance and that real charcoal BBQ flavor.

To make this product widely available and, due to the number of quality cart manufacturers of limitless design and imagination, It was decided to develop a "Fully Integrated Combustion Chamber Assembly that may be quickly and easily installed in any suitably prepared/designed BBQ cart. Such carts having the equipment necessary to operate the combustion chamber such as variable speed blower, controls, flex duct etc as well as the normal cart cooking equipment including grills rotisseries etc. Such a unit may be sold as a simple" DROP IN unit that could generally be easily incorporated into almost any manufacturers suitably modified or custom designed Outdoor Appliance style Cart, Built In or mobile. Said BBQ also offering distributors and cart manufacturers the opportunity to diversify or Differentiate themselves from competitors by offering their customers the freedom of choice and real charcoal barbeque taste with advanced modern styling, and, the advanced cooking features/performance required by modern consumers.

RELATED PRIOR ART/AREA'S OF SEARCH

With respect to present and past endeavours in charcoal BBQ design over many years, said original design, advantages and features of the device, have not been anticipated, attempted in the same, similar or any manner. Made obvious, or implied by any known prior art specifically or cumulatively and is based upon completely new operational/design premises. These include a design with simple air systems that permit/enable the following (a) The substantial exclusion of ambient air/and controllable replacement of supply air in the combustion process, this enabling full control of ignition/burn rate/Temp. etc. (b) The original application/use of Air to facilitate/assist in Ash removal/storage. (c) Control of heating surface conditions and (d) reduction of smoke/fumes/flames etc by multi purpose variable velocity lateral Air Sheet.

Wall and Outer casing Wall. The Burner wall, which connects the top and bottom perimeters, is perforated and is generally angled from top to bottom sufficiently to assist gravity in precipitating the flow of any combustion ash downwards from the large open top-heating surface to the bottom Ash exit.

During combustion, air from a variable speed blower feeds into the Air Plenum and then passes through the holes in the Inner Burner/plenum wall, and finally into the inner burner's 1/242/25A/25AA/25C/25R/276/290/299D/41R/51R . . . 219/400 . . . 270/300 . . .
248/509.
99/339/340/352/353/354/355/357/389/400/401/421H/421HH . . .
99/444-450 . . . 99/481/482.

| 4/788/905. | VON KUHORN. | FAN. | 3/266/478. | BOOTH. | FAN. |
|---|---|---|---|---|---|
| 3/159/119. | HOTTENROTH. | FAN. | 3/324/788. | LA. FRANCE. | FAN. |
| 3/326/201. | MURRAY. | FAN. | 5/168/860. | KIBOURIAN. | FAN. |
| 3/327/697. | BERLANT. | FAN. | 4/850/353. | DELLRUD. | FAN. |
| 4/287/870. | JOHNSON. | BLOWER. | MULTI USE HYBRID ADD-ON. | | |

The preceding examples of known prior art in charcoal BBQs have similarities to each other and probably fulfill or exceeds the requirements of their developers, which primarily appear to be faster start times. The Johnson device is for an "Indoor" Multi purpose Hybrid BBQ grill/Convection Oven/cooking device described as a Novel "Add-On" basic component/accessory to be used in conjunction with a Room heater fireplace tubular Heat Exchanger device.

Of the examples cited, non of these products meet or were intended to meet the broad requirements encompassed by the current device, the operation of which is simple, safe, and without complex controls. This device represents a practical user-friendly departure from previous charcoal BBQs. The capabilities of this device are deemed the basic necessary to encourage the development process essential to ensure the success/viability of future charcoal/solid fuel fired BBQ cooking systems.

SUMMARY OF INVENTION

It is hoped that the following very brief description unencumbered with repetition, minor complexities and drawing reference numbers, will enable the reader to quickly grasp the essence of this device which explains how the inherent problems as previously stated were solved. This will assist the reader to more completely appreciate the following more detailed descriptions, drawings and operation of the various components, air systems and the relationships between them.

Combustion Chamber Assembly Consisting of:
Combustion Chamber
Ash Chute
Ash Container
Primary/Secondary Air Systems The combustion chamber is comprised of; A generally "funnel shaped" inner Burner enclosed in a cylindrical outer casing having a large diameter open top which accepts the Inner Burners Top heating surface. The bottom of the outer casing is closed except for a centrally positioned hole into which the small diameter bottom perimeter of the Inner Burner fits and serves as the Ash Exit. The burner can have a symmetrical Funnel cross-section or in other embodiments may be of a more irregular cross section.

These two parts, which form the combustion chamber, are usually welded together at top and bottom Burner perimeters forming an Annular Air Plenum between the Inner Burner combustion space. When in operation this Variable Air Flow controls the initial ignition speed and continuing burn rate (Temperature). Although this embodiment uses a integral Plenum system to deliver air through the burner/plenum wall into the combustion space, other methods are can fulfill this requirement.

Air passing through the perforations in the Burner wall also agitates any ash accumulating in the charcoal bed and on the angled burner wall, this continuous agitation assists in the migration of ash from the Inner Burner Ash Exit into and through the Ash Chute (which is fixed to the base of the Combustion Chamber casing), and finally into the Ash Container which is essentially a closed cylindrical container removably attached and sealed to the Ash Chute exit by a large annular flange.

Solution to Problem 1: Very Slow Ignition

To start the combustion process, fire starters are placed on the fire grate and are then ignited, usually by a propane wand. Charcoal is then loaded into the top of the burner as required. Primary air from a "variable speed electric blower" is supplied into the Air Plenum, passing through the holes in the inner Burner/Plenum wall and finally into the inner burner combustion space where it promotes combustion. Ignition and complete flame propagation is extremely fast as flames progress upwards to the burner surface. This speed is derived from the "Funnel" shape of the Inner Burner providing an exponential increase of the combustion area and fuel/air supply towards the top of the funnel, More Air/fuel=More Heat. Time from fuelling and ignition, to a grill cooking temp of 400+ C/900+ F. takes approximately 6-8 minutes.

Solution to Problem 2: No Temperature Control

Temperature Control/Primary Air System is achieved by simply rotating the variable speed electric blower control switch, thus increasing or decreasing primary air supply into the combustion space (More Air=More Heat). This is used to control the rate of combustion (i.e. Temp.) once the fuel bed is ready for cooking. (i.e. Reached "Ash Over").

Solution to Problem 3: No control over "Fat Fires"

Smoke and "Flare Up" Secondary Air Suppression System, consisting of a 360 degree Horizontal Air Diffuser disposed on the vertical axis of the combustion chamber assembly, medially between the heating surface and the "cooking grill". Air from a variable speed electric blower supplies secondary air through a duct system to the 360 deg Horizontal Air Diffuser. High-speed air from the diffuser slot produces a radial Lateral Air Sheet from the center of the Inner Burner cooking surface to the outer perimeter of said burner. This continuous air sheet intercepts all smoke and fat "Flare Ups" above the heat surface, instantly blowing them out of the cooking area. This prevents excessive burning and contamination of food.

Solution to Problem 4: Messy Ash Clean Up

Automatic Ash Removal System. As Ash builds in the charcoal bed and on the Burner sidewalls, the flow of Primary air through the holes in the burner walls continually agitates any ash. This agitation and the effect of gravity results in it's continuous downwards migration through the Fire grate above the burner ash exit before passing through the Ash Chute into the removable Ash Storage Container which is fitted to the base of said Ash Chute, This ash is then disposed of when convenient/cool.

Additional Benefit: Cooking Surface "Even Heat" Control

The Lateral Air Sheet from the Horizontal Diffuser may be used on "Low" setting to move excessive heat from the center of the grill, which is hottest, to the outer perimeter of the grill, which is coolest. This variation in temperature is a result of the combustion chamber design, which has a funnel cross-section. Fuel is much deeper (hotter) at the center than fuel at the outer perimeter, which is shallow (cool). This airflow from center to perimeter is effective in reducing temperature variations.

Operational Note

Cooking temperatures may be rapidly raised by increasing the Primary Air Supply control. Care should be taken not to "overshoot" as reducing temperature introduces cooking delay. Operators should be familiar with air operation and should combine this with adjustable grill positioning until familiar with operating controls and grill characteristics. Moderate Primary/Secondary airflows are sufficient for most requirements (i.e. Low-Medium).

Operational Advantages

Although various Solid Fuels may be used including Aromatic Woods and Charcoal Fuels of any type. Purists prefer natural hardwood lump charcoal, ignited with Fire Starters made from natural aromatic woods mixed with food quality wax. In terms of cooking and when operated correctly, BBQs using this Combustion Chamber Assembly offers the following:

- High Speed Ignition, typically faster than other units. Cold to searing approx 8 minutes.
- Hotter than most units. True instant "Searing" (cauterizing) capability. 450/500 degrees Centigrade.
- Variable Combustion Rate Temperature Control (Operation of Primary Air)
- "Even-Heat" Surface Temp Control (Low speed Operation of Secondary Air)
- Automatic Ash removal/Storage (Continuous during operation. Empty as required)
- Continuous Smoke and "Flare-Up" Suppression system as required

BRIEF DESCRIPTION OF SEVERAL VIEWS OF THE DRAWINGS

In addition to the preceding Summary of the Invention, and to assist the reader to more realistically visualize the Combustion Chamber assembly, reference is made to specific numbering of significant components in the three various sub assemblies. This in conjunction with the accompanying drawings particularly FIG. 1 and FIG. 2. Should clarify any less than clear/concise descriptions. Note! Like reference numbers are common to all drawings. Components are not repetitively described.

Combustion Chamber 2. Upper Component.
Ash Chute 4. Mid Component
Ash Container 6. Lower Component.
Combustion Chamber 2. Upper Component.

Projecting above the combustion chamber is the Horizontal Air Diffuser 46, fitted onto the top of the Air Duct Extension 10 this Duct Extension "Push Fits" 16 into Central Air Duct 64 extending from the Ash Chute 4 into Inner Burner 8. "The flange" 50 fixed below the top of the Central Air Duct locates the Fire grate 38. The Inner Burner walls 36 are perforated with holes 12 allowing air to enter burner combustion space from Air Plenum space 14 between outer casing wall 60 and the Inner Burner Wall 36. Primary Air 32 supplies Air Plenum through duct 52 in base of the outer casing 60. The Ash Exit 66 at the Bottom of Inner Burner 8 directs combustion ash into and through the Ash Chute 4, which is attached to the base of the Combustion chamber. This ash then falls into the Ash Container 6, which removable fits to the Ash Chute bottom flange.

FIG. 2. is a cross-sectional view through the central vertical axis of the combustion chamber of FIG. 1.

FIG. 4. refers to plan view "B-B" from sectional view FIG. 2. This is a plan view which shows the ash chutes 4 top flange and screw holes 56 on the cylindrical body 20 and radial supports 30 which locate the central air duct 64. Below the top of the duct is located the flange 50 which supports the fire grate. The secondary air supply 34 flows through the supply duct 54, which intersects and conjoins with the vertical central air duct. The Ash Containers larger cylindrical body 22 is shown below the ash chute.

It is believed that this description and illustration of the component parts and their relative positions as shown in the drawings of the combustion chamber Assembly, will further assist the reader in appreciating the operation and features of the unit which are described in the Detailed Description of a Preferred Embodiment.

DETAILED DESCRIPTION OF A PREFERRED EMBODIMENT OF THE INVENTION

The following description describes a device which is essentially designed to burn charcoal, wood or similar solid fuels under controlled combustion air supply conditions, thereby enabling the solution of several previous problems inherent in former Charcoal BBQ, Designs. It should be noted that the device is not limited in form or application by this particular embodiment. Many variations are possible and the following description is for purposes of illustration rather than limitation.

Said device comprising several components which when assembled and in conjunction with various air systems, constitute a Combustion Chamber Assembly designed to substantially preclude the intrusion of ambient air from the combustion process. The heating surface is necessarily open, however this is not a factor when combustion is in process, as a controlled supply of Primary combustion air is being supplied through holes in the Inner Burner/Plenum wall from the base of the Inner Burner and upwards at various levels towards the heating surface. This results in substantial heat being radiated from the cooking/heating surface thereby excluding ambient air by vertical convection currents. It should be noted that all other components are also designed to exclude air from the Combustion Chamber Assembly.

From the above it will be appreciated that as the combustion process is virtually exclusively dependant on Primary combustion air being supplied by effective Air Systems, a degree of control over "Burn Rate" is achieved not previously available in a charcoal BBQs. This control in conjunction with a practical, efficient, Combustion Chamber Assembly design makes it possible to solve Major Problems, which previously virtually eliminated the Charcoal BBQ as a viable consumer product, these problems essentially being:

- HAZARDOUS IGNITION—Pouring volatile liquids over charcoal to speed ignition
- EXTREMELY SLOW—To reach cooking Temperature/fuel condition. (i.e. Ash Over)
- NO TEMPERATURE CONTROL—Too hot, spray water! Too cold add fuel and wait!
- FREQUENT FAT FIRES—"Flare—Ups" and Smoke
- MESSY ASH CLEAN-UP—Large amounts of hot ash, partially burnt fuel, etc.

As previously indicated this invention relates to a device which will enable consumers who would like to purchase a BBQ, the option of having a viable choice between gas powered units which have dominated the market for over 20 years, and a modern charcoal powered unit with arguably superior features.

Figure 1:
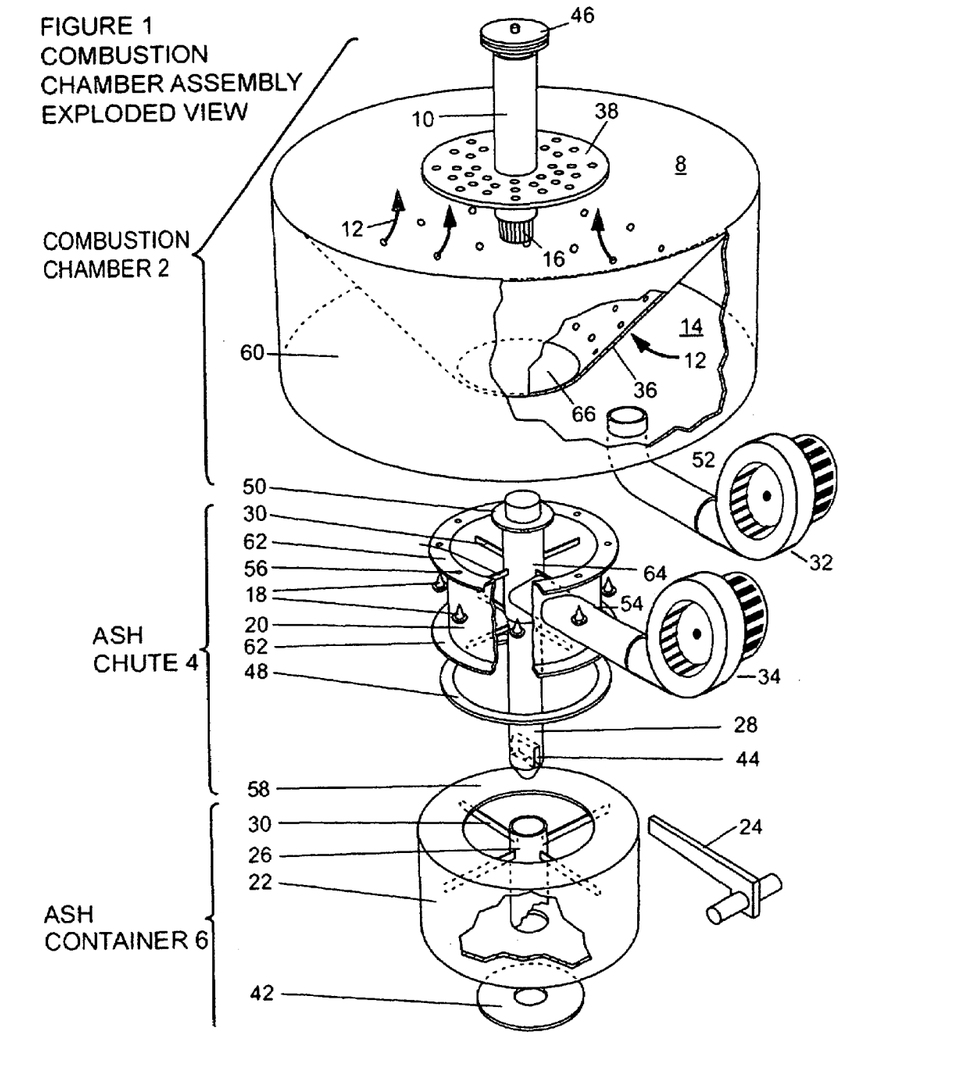
FIG. 1. is a front elevational "exploded view" of the Combustion Chamber assembly comprising three significant components according to the present embodiment. Through the "Cut Out" may be seen the Primary air supply duct 52 intruding into the base of the Outer Casing 60 which encloses the Inner Burner 8 to form a Dual wall combustion chamber resulting in the formation of the Annular Air Plenum.
Figure 2A:
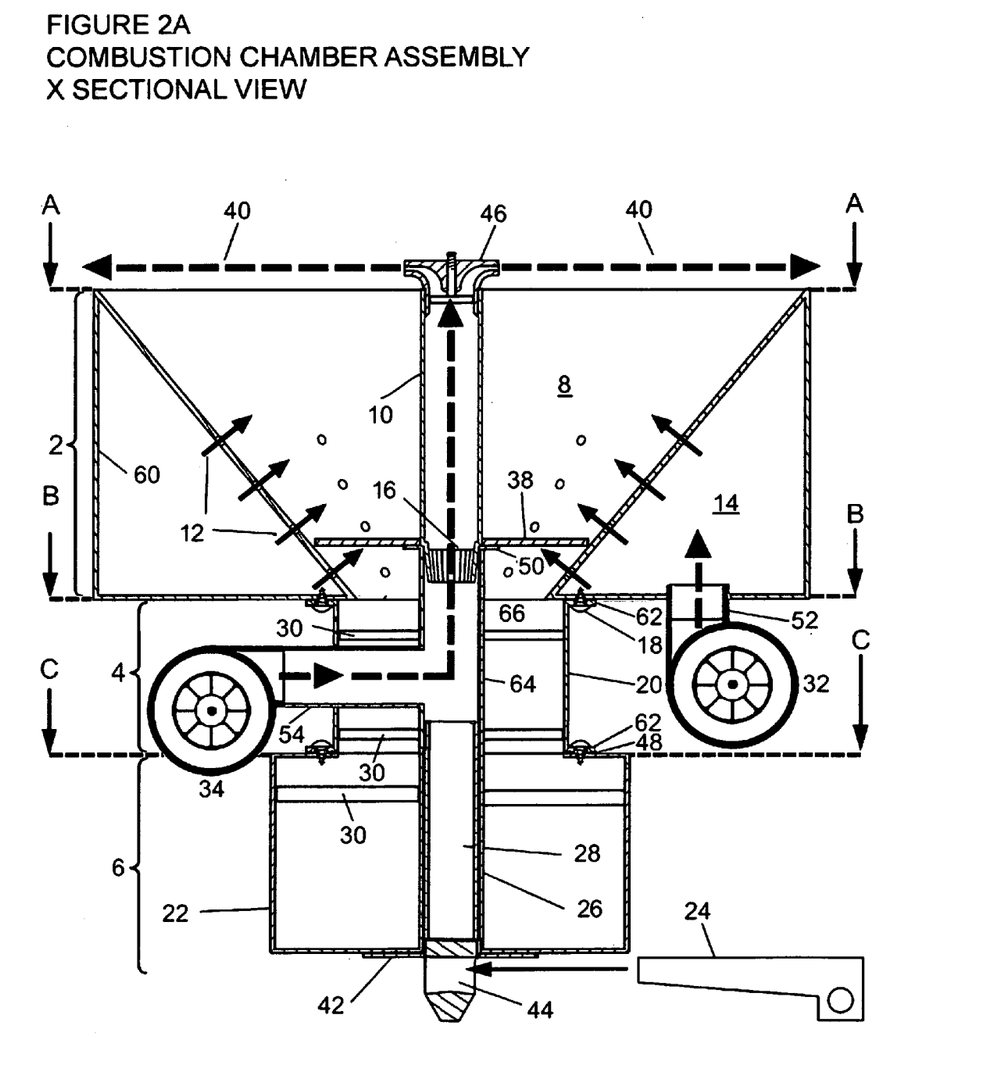
FIG. 2. is a cross-sectional view through the central vertical axis of the Combustion Chamber Assembly in FIG. 1. This shows the three major components with their internal parts in their substantially correct positions. This Sectional View in conjunction with the preceding exploded view FIG. 1. and the referenced descriptions [0023]-[0028] should clarify the concept and operation of this device.
Figure 2B:
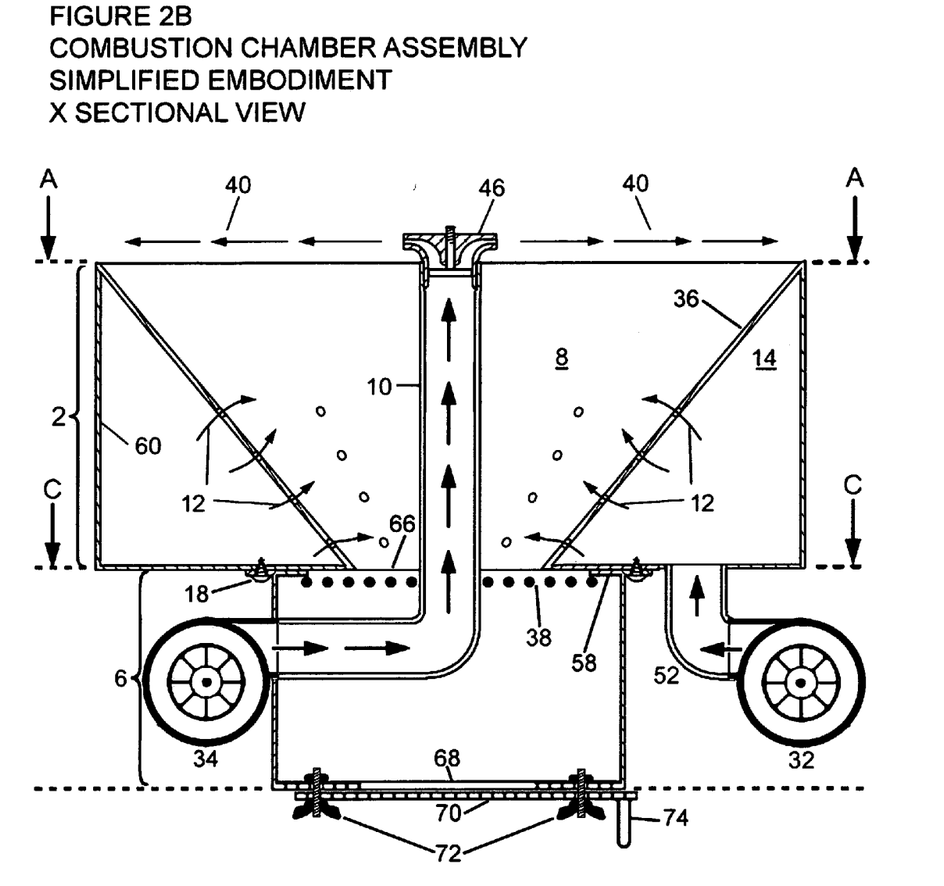
Figure 3:
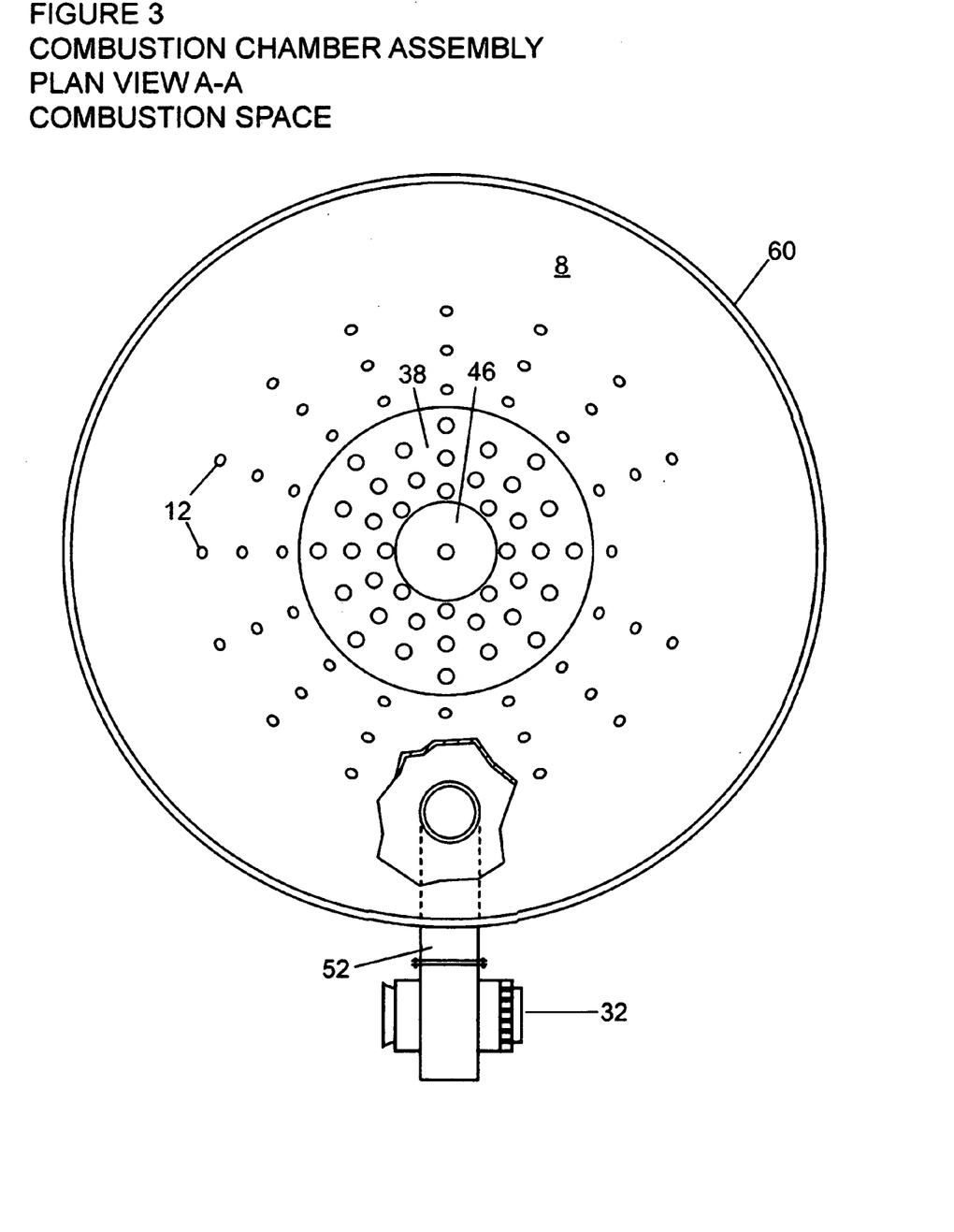
FIG. 3. refers to plan view "A-A" from Sectional View FIG. 2, and shows a top view of the Inner Burner walls 36. In the center is located the 360 degree Air Diffuser 46 mounted on top of the diffuser extension tube, The Fire grate 38 which has large holes is also clearly shown; this covers the Ash Exit to prevent fuel falling out of the burner. Also shown are the smaller primary air hole perforations 12 in the sloped walls of the Inner Burner wall.

BBQ Combustion Chamber Assembly (Refer to FIG. 1).

This comprises three major Components containing air/duct sub systems. Major Components are as follows:

- COMBUSTION CHAMBER 2 (Includes Primary Air System/Feed)
- ASH CHUTE 4 (Includes Secondary Air System/Central Air Duct Feed)
- ASH CONTAINER 6 (Removably Fits On Base Of Ash Chute)

Combustion Chamber 2 having an Inner Burner 8 of essentially open-ended funnels cross section. The Inner Burner walls 36 are generally angled inwards from the larger diameter perimeter of the open top-heating surface, downwards to the smaller diameter perimeter of the open bottom Ash Exit 66. This slope with the assistance of gravity is adequate to ensure the migration/precipitation of ash products down the Inner Burner walls 36 and out of the bottom Ash Exit 66.

A fire grate 38 is suitably located in the Inner Burner 8 above the relatively small diameter Ash Exit. This Inner Burner has rows of holes 12 located in the Burner wall, the first row being positioned below the fire grate 38 with subsequent rows positioned above. Each row of holes is generally parallel to the top edge of the burner perimeter with the holes being radially spaced.

This Inner Burner 8 is fitted into a cylindrical Outer Casing 60 having parallel sides and of adequate diameter and depth to precisely fit the Inner Burner 8. The large inner diameter open top of the Outer Casing 60 accepts the top perimeter of the Inner Burner. The bottom of the Outer Casing is substantially closed other than having a centrally located hole of sufficient size to accept the Inner Burners smaller diameter Ash Exit 66.

The Inner Burner 8 and Outer Casing 60 are joined together at top and bottom Inner Burner perimeters to form the Combustion Chamber 2. The open space between the Inner Burner walls 36, and the Outer Casing wall and base 60, forms an Annular Air Plenum 14, from which air can flow through the holes 12 in the Inner Burner/Plenum wall 36 and from there into the inner burner 8 combustion space. This Combustion Air is referred to as the Primary Air.

Primary Air System/High Speed Ignition

In operating the combustion chamber, several ignited fire starters are placed on the fire grate and covered with charcoal fuel (not shown). High speed Primary Air 32 from a variable speed blower is propelled through the air supply duct 52 into the Air Plenum 14 and through the rows of holes 12 in the Inner Burner/Plenum wall 36 directly into the Inner Burner combustion space at several levels towards the Heating Surface where combustion is rapidly accelerated. As the "Funnel" shaped Inner Burner 8 increases in volume from the bottom Fire Grate 38 to the heating surface, exceptionally fast flame propagation takes place due to burning fuel and superheated air expanding rapidly throughout the Inner Burner. This causes an incremental increase in flame spread and heat as volumetrically more fuel is exposed to the flames and additional air become available. This continual "feeding" process produces a flame which progresses quickly towards the surface of the combustion chamber. Note: Primary airflow should be reduced as ignition process proceeds to avoid overshooting of temperature.

When satisfactory "Fuel" cooking conditions are reached (i.e. "Ash Over"), primary air supply should be on a speed selected to maintain desired temperature (usually initially low).

Automatic Ash Disposal

An additional benefit of introducing air through the Inner Burner walls 36 is that it assists in the removal of combustion ash and the cooling of the inner burner wall. This flow of air through the holes 12 in the Burner walls 36 continuously agitates the ash in the fuel bed and on the sloped burner walls 36 which, eventually results in it's migration to the bottom of the Inner Burner 8 and out of the Ash Exit 66 into, and through the Ash Chute 4 before finally entering the Ash Container 6 for storage.

This ongoing removal of ash from the combustion chamber 2 not only improves efficiency but, marginally assists in control of temperature by reducing fluctuations in combustion rate caused by local variations in oxygen availability. It will be appreciated that as the Inner Burner 8 gets extremely hot, this heat is transferred into the Air Plenum 14 where it pre-heats the incoming primary air. This pre-heating of combustion air can improve fuel efficiency.

Ash Chute 4 Central Component

As shown clearly in FIGS. 1, 2, 3, and 4, the Ash Chutes body is of open ended cylindrical construction with external lateral flanges 62 that are welded to the top and bottom perimeters of the cylinder, said body being the same internal diameter as the Combustion Chamber Ash Exit 66 to which it is fitted by screws 18 through its top flange 62 into the base of the Combustion Chamber.

Figure 4:
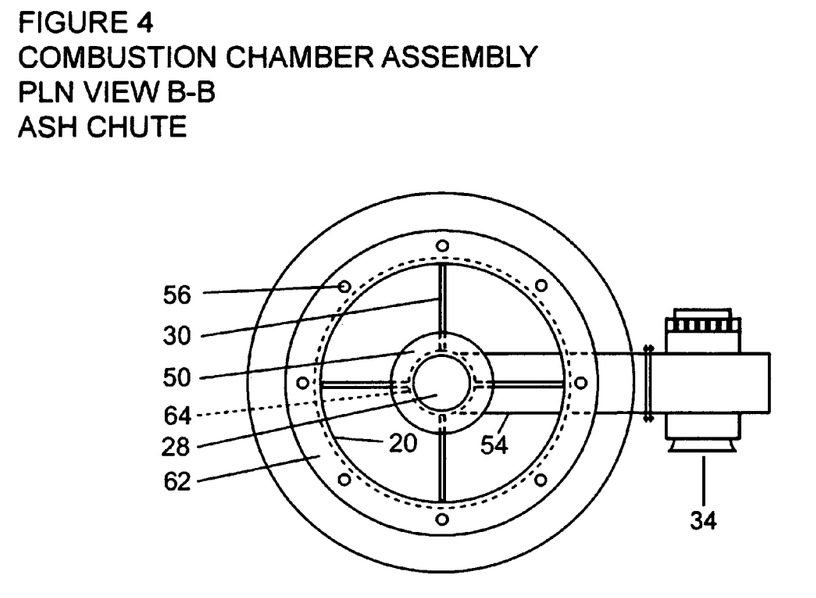
Figure 5:
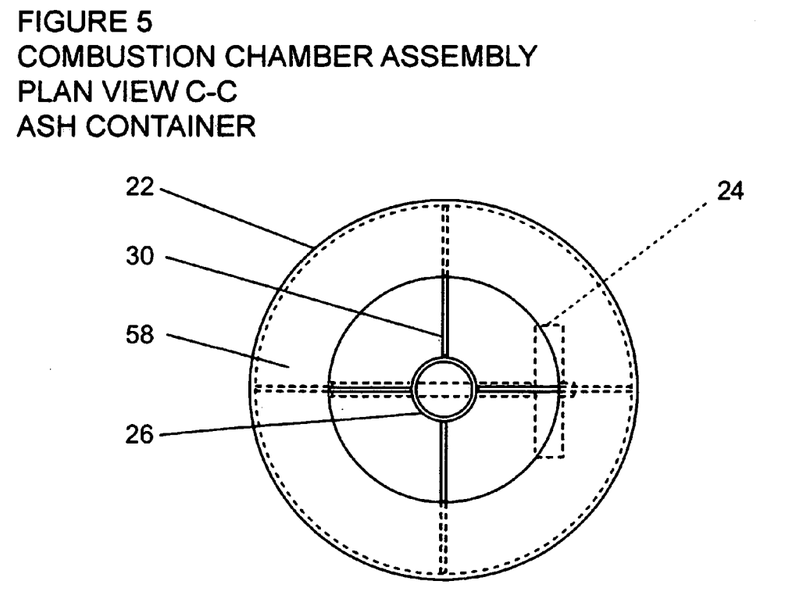
FIG. 5. refers to plan view "C-C" from Sectional View FIG. 2. This is the Ash Container 22 plan view, showing the ash containers wide Top Flange 58, Docking Pin Locator tube 26 supported and positioned by radials 30. The Taper Wedge 24 is shown in dotted outline.

The purpose of the Ash Chute 4 is multi fold. One purpose is to enable the transfer of ash by gravity from the combustion chamber Ash Exit 66 through the Ash Chute 4 and into the Ash Container 6 for storage and disposal. Yet another purpose is to house the Central Air Duct 64, which enables Secondary Air to be supplied to the 360 deg Horizontal Air Diffuser 46. Said Central Air supply duct being located on the Ash Chutes 4 central vertical axis and secured in position by radial supports 30 in known manner between the Ash Chute inner wall 20 and Central Air Duct 64 wall. The Central Air Duct 64 is conjoined at right angles with an external air supply duct 54, which intrudes through, and is sealed into, the Ash Chute wall 20. Note: The Central Air Duct is sealed at it's lower extremity by the Ash Container Docking Pin 28 which is mounted into and seals said duct ensuring all secondary Air is directed upwards to the 360 deg. Horizontal Air Diffuser 46. Air is supplied to this system by a variable speed electrical blower (supplied with BBQ cart by others). As with all other components, the elements of the secondary air supply system are designed and function so as to significantly limit ambient air from entering the Combustion Chamber Assembly.

Ash Container 6 Lower Component

As shown in FIGS. 1, 2, 3, and 5 the overall size of the Ash Container 6 is larger than that of the Ash Chute 4 in order to reduce the frequency of emptying cycles. Its purpose is to store ash until it is convenient and sufficiently cool to dispose of. The Ash Containers body 22 is of cylindrical construction and its top is partially closed by a wide internal annular flange 58. The outer diameter of said flange being the same as the Ash Containers cylindrical body 22 to which its perimeter is welded. The large diameter central hole is the same diameter as that of the Ash Chute's 4 lower exit to which it is aligned by the Docking Pin 28 which extends from, the lower extremity of the Central Air Duct 64 located on the vertical central axis of the Ash Chute 4. The base of the Ash Container 6 is essentially closed with the exception of a small central hole through which the Ash chute Docking Pin 28 protrudes after passing through the Ash Containers Central locator tube 26. The Central Locator Tube 26 and Thrust washer 42 are welded into a sized hole precisely located centrally in the base of the Ash Container 6. The Locator Tube 26 is also secured at it's top extremity by evenly spaced welded radial supports 30 which extend from the inner cylindrical wall of the Ash Container 6 to the outer wall of the Central Locator Tube 26. This Central Locator Tube 26 acts as a "Locator" device for the Ash Chutes 4 relatively close tolerance Tapered Docking Pin 28. This method of component alignment is accurate, simple, and relieves the BBQ owner from the stress of trying to align parts that are sometimes difficult to see. The Ash Container 6 is simply offered up until the tapered tip of the docking Pin 28 projecting from the Ash Chute's base 4 slides into the top of the Central Locator Tube 26 of the Ash Container 6. The Ash Container is then lifted up until the Docking Pin 28 protrudes out of the base of the Ash Container 6. A Tapered Wedge 24 is then inserted as far as reasonable into the machined slot 44 in the Docking Pin 28. The taper wedge bears onto the sealing thrust washer 42 and this ensures that the top flange of the Ash Container seats firmly against the ash Chutes lower flange 62 and seal 48. Other embodiments have a Docking Pin that has a threaded section at the tapered end and this enables it to be screwed into a female threaded section in the base of the ash Container locator tube. Both systems enable fast convenient On/Off fitting to the Ash Chute flange.

The secondary air system supplies air to the Horizontal Air Diffuser 46, which is located on the central vertical axis of the Combustion Chamber Assembly 2 as shown in FIGS. 6 and 7. It is positioned between the combustion Chamber 8 heating surface and the first cooking grill above the Heating Surface. (Not shown, part of the BBQ Cart). Said Central Supply Duct 64 supplies all secondary air from a variable speed electric blower.

The "Upper extremity" of the vertical central air duct has a fire grate 38 located on the support flange 50 welded approximately 1" below its top. As previously noted, this duct extends upwards from the Ash Chutes 4 lower flange, through the Combustion Chamber Ash Exit 66 and into the Inner Burner 8 before it then passes through the center of the Fire grate 38, which is positioned and supported on said flange 50. The part of the duct protruding above the Fire grate is slightly flared to provide a socket for the reduced diameter 16 of the Horizontal Air Sheet Diffuser extension duct 10 to fit into.

The "Lower extremity" of the vertical central air duct 64 is sealed/Plugged by welding in the Ash Chute Docking Pin 28. This ensures all Secondary air is directed upwards to the Horizontal Air Sheet Diffuser 46, which is positioned on the central vertical axis between the Combustion Chamber Inner Burner 8 top heating surface and the first cooking grill (grill not shown part of cart). Said Docking Pin 28 extends several inches from the base of the Ash Chute 4 and is of sufficient length to pass through the Ash Containers 6 central Docking Pin locator tube 26.

Horizontal Air Diffuser 46

The function of this 360 degree Horizontal Air Diffuser is to provide a variable velocity radial Lateral Air Sheet 40 between the heat surface and cooking grill. When set on a Medium-High setting, the Lateral Air Sheet 40 which is radiated through the diffuser slot from the center of the burner, effectively intercepts and instantly blows to the outer perimeter of the cooking area all Smoke and "Flare Ups" that occur as a result of fats or liquids that drip onto the heat source from various foods.

This system simply and effectively reduces the possibility of food having a burnt taste, and also reduces the chances of carcinogenic substances being formed. The air velocity may be adjusted according to the severity of "Flare Up" conditions (i.e. very fatty foods cooked at temperatures temporarily too high). Higher velocities not only more aggressively disperse "Flare-Ups", they may also be used to temporarily reduce the heat reaching the meat from the burner surface.

"Even Heat" is another function of the air diffuser's 46 ability to reduce variations in heat over the cooking surface. This is particularly desirable with this type of burner design as these temperature fluctuations are caused by variations in the depths of fuel as a result of the Combustion Chamber having an Inner Burner 8 of "Funnel" cross-section. Consequently, the depth of fuel around the central vertical axis is greater and therefore hotter than at the outer perimeter, which is shallower, therefore cooler. This even heat over a cooking surface is conducive to obtaining consistent cooking results. When not cooking High Fat Content foods, low air sheet velocities should always be selected to reduce temperature variations across the cooking surface and also to remove any fuel fumes or smoke. The Horizontal Air Sheets radial outflow of air from the central vertical axis across the cooking surface moves Hot air from the center to the outer perimeter. By adjusting the air velocity, more or less heat may be moved from the center to relatively evenly disperse the radiant heat.

This Secondary Air System Diffuser is ideal for indirect or convection cooking of fish, chicken, lean cuts of pork etc. when used with a heat baffle plate placed on the cooking grill between the food and the heat source.

With respect to the foregoing, dimensions are not included as it will be apparent that specific dimensions and dimensional relationships between parts shown or described may include variations in sizes materials and shape, form, function and manner of operation. With respect to this disclosure the manufacture, assembly and manner of operation will now be deemed/considered obvious and apparent to those relatively skilled in the art.

Note: Unless specified otherwise all components are manufactured from Stainless Steel of varying grades.

General Operation of Combustion Chamber.

Charcoal is ready to be cooked over when the Charcoal bed is fully ignited with all surface charcoal glowing evenly, having a light coating of grey ash and without any flames being apparent. This condition of readiness is commonly referred to as "Ash Over" fire starters are placed onto the Fire Grate located in lower part of the Inner Burner above the Ash Exit; these are then ignited in any convenient manner. The fuel is then placed over the Fire Starters and the Primary Air Control Switch is selected "On". It may then be rotated progressively from "Low" to "High". This initial setting determines the air velocity from the Air Blower into the Plenum, through the perforations in the Inner Burner/Plenum Wall and finally into the combustion space where it also determines the speed of combustion. The correct amount of Charcoal (or other selected suitable solid fuel) is determined based on several factors, essentially the amount of food to be cooked, burn time required and cooking method (i.e. fast or slow). As with all new equipment, familiarity and experience quickly enable operators to estimate reasonably accurate requirements.

If the Primary (Combustion Air) velocity has been set too high, the required "Ash Over" condition is achieved exceptionally fast, however the cooking temperature may be too high for the food being cooked. If the temperature is not extremely high the operator may elect to use a cooking grill positioned higher above the heat surface, or, it may be necessary to reduce the Primary Air Control setting and wait until the fuel cools down. Alternatively, the fastest method of reducing the heat radiated from the heating surface is to turn "Off" the Primary (Combustion) Air supply, which virtually terminates the combustion process. Then turn "On" the Secondary (Diffuser) Air Supply control switch, which operates in the same manner as the Primary air control switch. This Secondary air system supplies air to the 360 deg Horizontal Air Diffuser that is located on the Combustion Chambers central vertical axis medially between the heating surface and the cooking grills.

When selected on "High", a 360-degree relatively high velocity lateral Air Sheet is projected from the central Diffuser over the heating surface to the outer perimeter of the cooking area. This airflow is very effective in blowing away excess heat radiated off the cooking surface and from the cooking area, thus assisting in lowering the cooking temperature. When the required temperature is reached, cooking may commence.

A further application for higher Diffuser Air Flow settings is to eliminate "Flare Ups". These are the result of fats dripping from meat on the cooking grill, down onto the hot charcoal coals. The fat immediately vaporizes, ignites and may burn the meat, however, the continuous lateral air flow from the diffuser instantly intercepts and blows these "flare ups" from the cooking area. As the velocity of this Lateral (Secondary) Air Flow is variable and controlled in the same manner as the Primary (Combustion) Air Supply. Moderate experience and experimentation with the Primary and Secondary Air Systems quickly enables the operator to adjust and control his temperature requirements.

After the fuel has reached a satisfactory cooking condition, the Primary Air system control is normally set in the "Low" position having been gradually reduced as the coals reach "Ash Over" condition and the required Temperature. This gradual reduction prevents temperature "Overshooting" and saves time and fuel. The Secondary Air system is also usually operated in "Low" mode in order to project a continuous low speed lateral Air sheet from the Horizontal Air Diffuser which assists in dispersing minor smoke and fuel fumes whilst maintaining "Even Heat" distribution across the heating surface. In the event that food with a high fat content and/or "Flare Up" potential is being cooked, fat should be dressed off if possible. The Secondary air control switch may be adjusted higher as and when required. As mentioned, this increases the air velocity and consequently the effectiveness of the lateral Air Sheet to eliminate fat fires. When the BBQ has cooled down, The Ash Container should be occasionally emptied.

As previously mentioned throughout this petition. The BBQ cart including all variable speed electric blowers, their connections and control equipment, as well as all ducting and cart cooking equipment including food grills etc. are supplied by the cart manufacturer and are not part of this petition.

Variations

Although a certain embodiment has been described, a number of variations have been envisioned evaluated and/or tested. In order to satisfy particular requirements, market demands etc. There are applications that could require larger cooking/multiple surfaces. Such applications could use multiple or large square rectangular or circular units using common services if convenient. Although the combustion chamber may not be necessarily circular, square or rectangular, the Mounting/Transition inserts are easily modified to suit a square or rectangular "Cut Out" in the cart unit. Large oval units (two semi circular ends separated by a straight section) are possible. A square Burner is simply an inverted Pyramid with corner radii being determined by the Ash Exit contour. Also unless individual controls are desirable, several units irrespective of shape may be combined into a single cooking unit and may selectively share specific systems (i.e. Air Systems).

As mentioned previously an oval inner burner consists of two semi circular end sections spaced apart by a rectangular center section, the walls of which would slope inwards from the top perimeter to a central bottom slot. Each semi-circular end of the oval would slope inwards in a half cone configuration to join the center section slot. To effectively cover a shape such as described may require more than one horizontal diffuser delivering various airflow patterns.

It is foreseen that lower cost variants having the more essential features is possible by simplifying/modifying components. e. Combustion Chambers coupled to Ash containers. Burners without Plenum air systems and using external air supply systems originating from top or bottom of the unit with systems sharing a Central Air Delivery system As has been shown, modifications are possible by those skilled in the art without departing from the intent of the device. Despite these variants, basic concepts are adhered too and it is the purpose of the claims made to include all variations as may fall within the scope of the invention.

What is claimed is:

1. A charcoal BBQ grill assembly comprising:

a circular annular air plenum having a right angled triangular cross section with a sloped inner plenum wall which slopes down from a larger diameter top of the annular air plenum to a smaller diameter at a plenum base, said sloped inner plenum wall defining an open funnel shaped combustion space having an open top heating space having said larger diameter and a bottom ash exit including a fire grate to support a fuel charge;

the sloped inner plenum wall of said combustion space having a plurality of perforations, said perforations being spaced in concentric circles extending in even increments from above said fire grate upwardly towards the top of the combustion zone;

said annular air plenum further comprising an air inlet duct installed into the plenum base and to which is mounted a primary variable speed blower to supply primary combustion air into said annular air plenum thereby enabling controlled air distribution into the combustion zone through said perforations;

said BBQ grill assembly further comprising an ash storage assembly fitted to the bottom ash exit, said ash storage assembly having a secondary air duct and a secondary variable speed blower fitted into the side of said ash storage assembly;

said BBQ grill assembly further comprising a 360 degree horizontal slot air diffuser positioned on the central vertical axis of said combustion chamber above the top of said combustion space and operable to project a lateral air sheet medially between a top of said combustion space and a cooking grill, wherein said lateral air sheet intercepts and disperses flare-ups and smoke caused by meat fats dripping onto hot coals.

2. A charcoal BBQ grill assembly of claim 1 wherein said funnel shaped combustion space holds a charge of solid fuel within the combustion space.

3. The charcoal BBQ grill assembly of claim 1, wherein said assembly is operable during the combustion process to substantially preclude the intrusion of ambient air into the combustion space.

4. The charcoal BBQ grill assembly of claim 1, wherein a fire grate separates the combustion space from the ash exit.

5. The charcoal BBQ grill assembly of claim 1, wherein said ash storage assembly includes an ash chute attached to the ash exit and an ash storage container removably attached to the ash chute.

6. The charcoal BBQ grill assembly as in claim 5, wherein the secondary air supply duct is coupled to the ash chute said assembly substantially precludes the entry of ambient air when the ash storage container is installed and the system is operable.

7. The charcoal BBQ grill assembly as in claim 1, wherein said lateral air sheet diffuser head projects a continuous air sheet across the top of said combustion space.

8. The charcoal BBQ grill assembly as in claim 1, wherein said secondary air duct is connected to the air diffuser means.

9. The charcoal BBQ grill assembly as in claim 1, where agitation of ash following air stimulation, combined with the effects of gravity and the sloped inner plenum wall, results in the migration of ash downwards to the ash chute.

* * * * *